United States Patent [19]

Hardison

[11] Patent Number: 5,437,819
[45] Date of Patent: Aug. 1, 1995

[54] FLUID CONTACTING APPARATUS AND METHODS OF MAKING THE SAME

[75] Inventor: Leslie C. Hardison, Barrington, Ill.

[73] Assignee: ARI Technologies, Inc., Barrington, Ill.

[21] Appl. No.: 187,639

[22] Filed: Jan. 26, 1994

[51] Int. Cl.⁶ .............................................. B01F 3/04
[52] U.S. Cl. ......................... 261/94; 261/DIG. 72; 261/112.2
[58] Field of Search ............... 261/112.2, DIG. 72, 261/94

[56] References Cited

U.S. PATENT DOCUMENTS

| | | | |
|---|---|---|---|
| 2,615,699 | 10/1952 | Dixon | 261/DIG. 72 |
| 3,218,048 | 11/1965 | Smith, Jr. et al. | 261/94 |
| 3,243,170 | 3/1966 | Ellis et al. | 261/94 |
| 3,331,725 | 7/1967 | Mercer | |
| 3,384,530 | 5/1968 | Mercer et al. | |
| 3,466,151 | 9/1969 | Sicard et al. | 261/112.2 |
| 3,554,853 | 1/1971 | Mercer | |
| 3,870,485 | 3/1975 | Shiraishi et al. | 261/DIG. 72 |
| 3,917,889 | 11/1975 | Gaffney et al. | |
| 4,184,946 | 1/1980 | Kato | 261/DIG. 72 |
| 4,674,888 | 6/1987 | Carlson | 261/76 |

FOREIGN PATENT DOCUMENTS

| | | | |
|---|---|---|---|
| 0069241 | 1/1983 | European Pat. Off. | 261/DIG. 72 |
| 1115750 | 10/1961 | Germany | 261/112.2 |

*Primary Examiner*—Tim R. Miles
*Attorney, Agent, or Firm*—Banner & Allegretti

[57] ABSTRACT

A fluid contacting apparatus is constructed by coiling a ribbed, net-like material into a cylindrical core which is then placed in a retaining vessel through which fluids flow.

5 Claims, 2 Drawing Sheets

FLUID CONTACTING APPARATUS AND METHODS OF MAKING THE SAME

BACKGROUND OF THE INVENTION

1. Field of the Invention

The invention relates generally to structures used for intimate contact between fluids to effect mass transfer therebetween. More particularly, the invention relates to a fluid contacting device having a coiled core made from ribbed, net-like material.

2. Description of Related Technology

Packed columns have been used extensively for gas/liquid contact resulting in interactions, reactions and other mass transfer operations between fluids. However, where gas/liquid contact results in the formation of solid particles, plugging is a problem in packed column contactors as well as in many other conventional fluid contacting devices. For example, in the process of oxidizing hydrogen sulfide contained in a gas stream into elemental sulfur by contacting the stream with an alkaline scrubbing solution, solid particles are necessarily formed, invariably resulting in plugging problems in the packed columns traditionally used for this process.

In order to avoid or reduce plugging of a contacting device, it is desirable to utilize a gas/liquid contactor which provides flow paths for the gas and liquid that do not have sharp changes in direction or interruptions in flow which would provide a place for plugging to originate. However, this consideration must be balanced with the main purpose of the contactor which is to provide intimate contact between the gas and liquid. Furthermore, gas/liquid contactors are preferably designed to achieve the appropriate transfer operation with a minimum expenditure of energy and capital investment.

SUMMARY OF THE INVENTION

It is an object of the invention to overcome one or more of the problems described above.

According to the invention, an apparatus for fluid contact comprises a coiled core of flexible, net-like material disposed in a retaining vessel. The net-like material of the core includes a first set of substantially parallel ribs and a second set of substantially parallel ribs transverse to the first set of ribs. When coiled, the first and second sets of ribs form alternating layers of fluid flow paths which spiral in opposite directions.

The invention also comprehends a method of making a fluid contacting apparatus according to the invention.

Other objects and advantages of the invention will be apparent to those skilled in the art and from the following detailed description, taken in conjunction with the drawings and the appended claims.

DETAILED DESCRIPTION OF THE INVENTION

Figure 4:
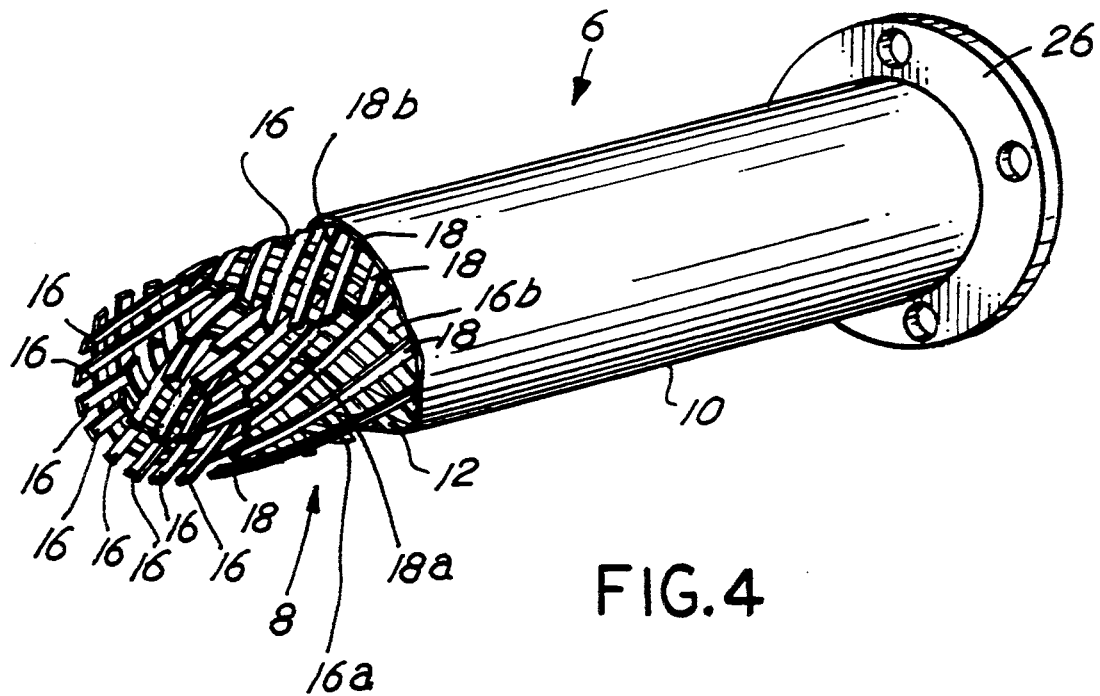
FIG. 4 is a perspective view of a gas/liquid contacting device according to the invention with portions removed to show the detail thereof.

FIG. 4 illustrates a mass transfer apparatus according to the invention, generally designated as 6 which includes contacting means illustrated by a coiled contactor or core 8 disposed in retaining means illustrated by a retaining vessel 10.

Figure 1:
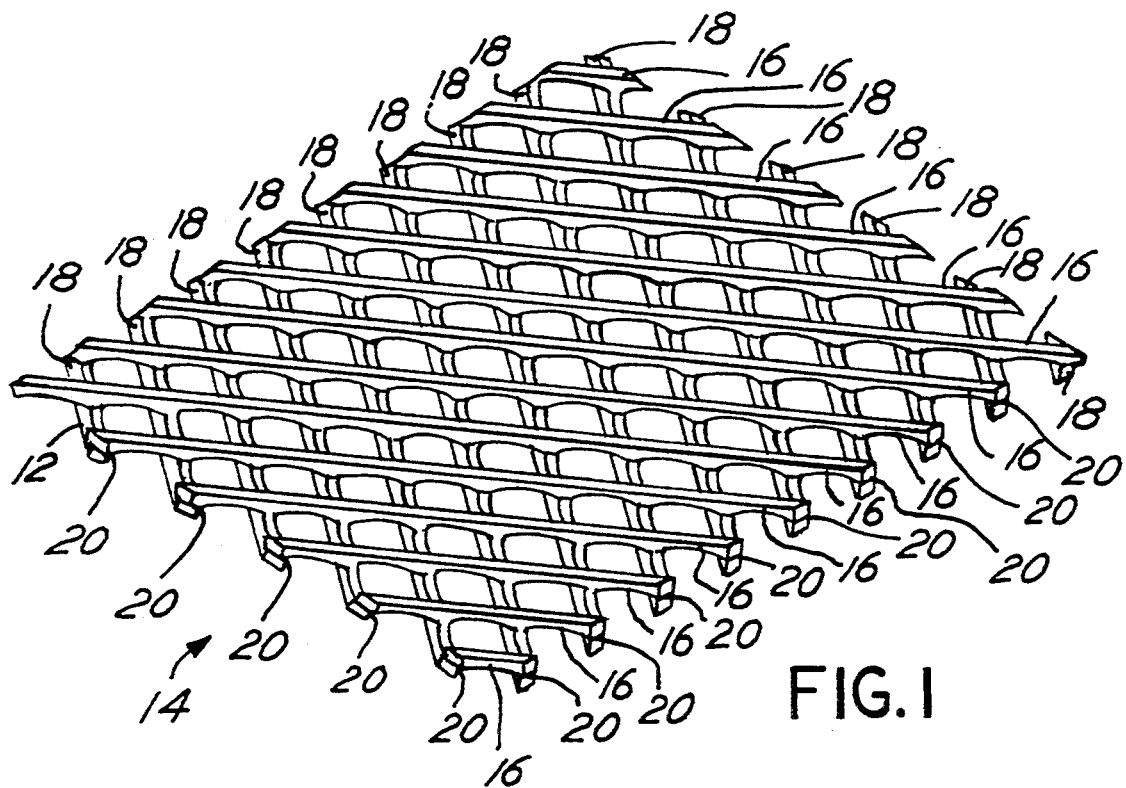
FIG. 1 is a perspective view of a portion of a sheet of material utilized to construct a gas/liquid contacting device according to the invention.
Figure 2:
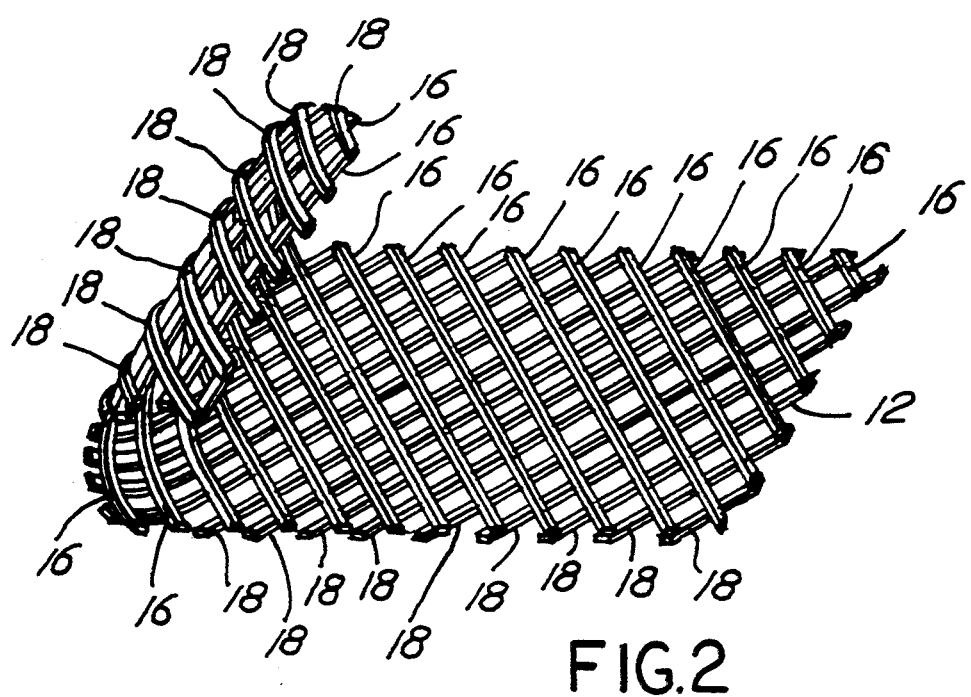
FIG. 2 is a reduced perspective view of the sheet of FIG. 1, shown in a partially coiled configuration.

The contactor 8 is made from ribbed, flexible, net-like material 12 shown in FIGS. 1, 2 and 4. A substantially rectangular piece 13 of the net-like material 12 is rolled or coiled as shown in FIG. 2 to form the contactor 8. FIG. 1 shows a portion 14 of the sheet 13 illustrating first and second sets or groups of parallel ribs 16 and 18 respectively which make up the net-like material 12. The ribs 16 are transverse to the ribs 18 and are disposed on the opposite side of a median plane of the sheet 13 from the ribs 18. The ribs 16 and 18 are integral or otherwise fixed along the median plane at each intersection 20 of a rib 16 and a rib 18.

The ribs 16 and 18 form oblique angles with lines defining the sides (i.e. perimeter) of the rectangular sheet 13. Stated another way, the ribs 16 and 18 are not parallel to any of the legs of the right angles defining the corners of the rectangular sheet 13. Therefore, when the sheet 13 is coiled to form the contactor 8, the ribs 16 and 18 are bent into spirals, with each rib 16 adjacent to a rib 18 and spiraling in a path diametrical thereto. The ribs 16 and 18 therefore provide alternating layers of flow paths for fluids flowing through the vessel 10. This relationship can be seen by following the paths of ribs 16a, 16b, 18a and 18b in FIG. 4. The layers of flow paths formed by the ribs 16 and 18 spiral in opposite directions, generating turbulence at the interfaces between streams going in different directions, resulting in excellent contact between gas and liquid streams in the device 6. The flow paths formed by the ribs 16 and 18 also are continuous and have no sharp changes in direction or interruptions in flow which could provide a place for plugging due to the formation of solid material as a result of a countercurrent or cocurrent gas-liquid contacting process.

The inventive device has several attributes which appear to be important in achieving adequate gas/liquid contact. For example, the coiled contactor configuration greatly increases the effective length of the flow channel (as compared with the length of the vessel containing the contactor). All the flow paths formed by the spiraling ribs 16 and 18 are the same length. Furthermore, the inventive coil configuration greatly decreases the effective hydraulic diameter. The residence time of the gas and liquid in the contactor can be made relatively short which is advantageous in certain operations such as certain hydrogen sulfide oxidations processes.

The net-like material 12 utilized for the apparatus and method of the invention may be made from any flexible substance and is preferably made from extrudable plastic. The process for preparing the net-like extruded plastic material is well known in the art. Methods and apparatus for making such net-like materials are taught for example in Mercer, U.S. Pat. No. 3,331,725 and Mercer et al., U.S. Pat. Nos. 3,384,530 and 3,554,853, the teachings of which are incorporated by reference herein.

Briefly, the net-like material is formed by extruding the plastic through pairs of rotating dies having slots. The dies rotate in opposite directions and extrude the molten plastic in a diamond-shaped pattern. A continuous cylinder of the net-like material results and, upon cooling is slit and flattened, forming a continuous flat sheet having a plurality of parallel ribs crossing a plurality of parallel ribs located in a different plane and with each of the ribs being disposed at an oblique angle to the centerline of the sheet. Widths of the sheet typically range from about 7 to about 15 feet.

The above-described preferred plastic net-like material is simple and inexpensive to manufacture. Furthermore, although it has little strength as a flat sheet, it provides a strong cylindrical core when coiled and disposed securely and snugly within a retaining vessel.

Figure 3:
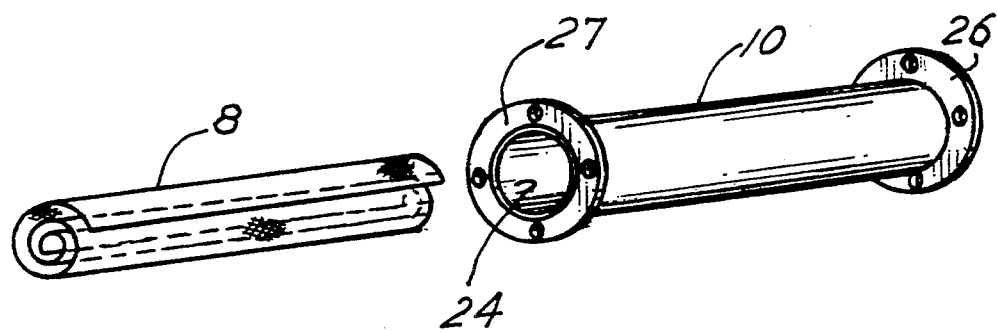
FIG. 3 is a reduced perspective view of the sheet of FIG. 2 shown in a coiled configuration and with a retaining vessel.

A method of making an apparatus according to the invention includes rolling, i.e. coiling, a substantially rectangular sheet of net-like material 12 into a substantially cylindrical coiled core 8 and then placing the core 8 into the cylindrical vessel 10 as shown in FIG. 3 to result in the inventive device illustrated in FIG. 4. The core 8 is preferably tightly fitted within the vessel 10 and held securely and supported by inner walls 24 of the retaining vessel. Fasteners (not shown) may also be attached to the vessel 10 and the core 8 at one or both ends 26 and 27 of the vessel 10 in order to retain the core 8 in the vessel 10.

The resulting device 6 may then be connected at each of the ends 26 and 27 to other processing equipment (not shown) and the gas and liquid to be contacted may be flowed therethrough by either countercurrent or cocurrent flow.

Although the inventive device is described as a gas/liquid contactor, and has been found effective in the process for absorption of $H_2S$ into an alkaline scrubbing solution, its usefulness is foreseen in other industrial and environmental control applications requiring contact between a variety of fluids. Therefore, the inventive device should not be considered limited to gas/liquid contact.

Because the preferred net-like material 12 is made in continuous flat sheets, the diameter of the cylindrical contactor 8 may be any desirable size. Where a large diameter contactor 8 is desired, the problem of placing the contactor into the retaining vessel 10 may be solved by providing a mandrel (not shown) disposed in the vessel 10 and winding the net-like material 12 onto the mandrel by inserting the material 12 through a opening (not shown) in the vessel 10.

A plurality of contactors 8 may also be utilized as random packing, for example, for gas/liquid scrubbers. The packing is prepared by coiling the net-like material 12 into cylinders having a small diameter (e.g. about two to about three inch diameter) and several feet in length. Plastic straps, spaced at about every two inches, are disposed about the cylinder 8 and tightened. The cylinder 8 is then cut into short cylinders approximately two inches in length, each cylinder being held in a coiled configuration by a plastic strap. The resulting inexpensive packing cylinders are of approximately the same size, shape and density of commercially available plastic packing and are easily loaded into a retaining vessel through which fluid to be contacted may be flowed.

EXAMPLE

The invention is further described and illustrated by the following detailed example which is not intended to be limiting.

Six tests were conducted utilizing a gas/liquid contactor according to the invention in a process for removing $H_2S$ from a gas stream by absorption into a an iron and water solution using a 628 mg/kg Fe catalyst. The gas/liquid contact was produced by co-current flow of the gas and liquid through the contactor.

The gas/liquid contactor was made by coiling a plastic net-like material according to the invention (a "drainage net" product of the National Seal Company) to a diameter of approximately two inches. The length of the gas/liquid contactor was approximately 3.27 feet. The results of the tests are summarized in the following Table.

TABLE

| $H_2S$ FLOW SCFH[1] | TOTAL GAS FLOW SCFH (SCFM)[2] | LIQUID FLOW (GPM)[3] | Fe: $H_2S$ RATIO | $H_2S$ IN CONC.[4] ppm[5] | GAS/LIQUID VOL. RATIO | EFFICIENCY % |
|---|---|---|---|---|---|---|
| 5.31 | 160 (2.7) | 2.0 | 0.89 | 25,670 | 10 | 95.1162 |
| 2.66 | 160 (2.7) | 2.0 | 1.78 | 15,000 | 10 | 99.9764 |
| 2.66 | 160 (2.7) | 1.0 | 0.89 | 19,360 | 20 | 86.3809 |
| 2.66 | 80 (1.33) | 1.0 | 0.89 | 28,270 | 10 | 94.6225 |
| 2.66 | 80 (1.33) | 2.0 | 1.78 | 28,300 | 5 | 99.9630 |
| 5.31 | 80 (1.33) | 2.0 | 0.89 | 49,793 | 5 | 97.7618 |

[1]Standard Cubic Feet/Hour
[2]Standard Cubic Feet/Minute
[3]Gallons/Minute
[4]Measured Concentrations
[5]Parts Per Million Excess sodium bicarbonate was added during the tests so that alkalinity was originally 5.7 g/kg expressed as $KHCO_3$. Additional bicarbonate was added twice when absorber pH and efficiency fell, bringing alkalinity up to about 6.4 g/kg and 7.0 g/kg, respectively. Oxidizer pH was controlled by adding $CO_2$ to the oxidizer air.

The measured equilibrium concentration of $H_2S$ in the air over the absorber liquid effluent sample ranged from 0.0 to 100 ppm. Outlet $H_2S$ concentrations were at least twenty times the recorded equilibrium concentrations.

The gas/liquid contactor according to the invention performed adequately in the absorption of $H_2S$ into a liquid stream. It did not plug up or show any signs of plugging during the six tests described above.

The foregoing detailed description is given for clearness of understanding only, and no unnecessary limitations are to be understood therefrom, as modifications within the scope of the invention will be obvious to those skilled in the art.

I claim:

1. An apparatus for use in multi-phase contacting of fluids comprising:
   a retaining vessel; and
   a substantially cylindrical contactor disposed in the retaining vessel, said contactor formed by coiling a single substantially rectangular sheet of flexible and resilient net-like material into a substantially cylindrical shape, said sheet when in a substantially flat configuration comprising first and second sets of solid unitary plastic parallel ribs, the first set of ribs transverse and intersecting in a diamond pattern with the second set of ribs and the first and second sets of ribs being disposed on opposite sides of a median plane of the sheet, both first and second sets of ribs being fixedly attached where they intersect each other and oriented obliquely with respect to sides of the sheet.

2. The apparatus according to claim 1 wherein the retaining vessel is substantially cylindrical in shape, having a diameter slightly larger than the diameter of the contactor with the contactor being snugly contained in the vessel.

3. A method of making a fluid contacting device comprising the steps of:
 a) providing a retaining vessel;
 b) providing a single substantially rectangular sheet of a net-like material comprising first and second sets of solid unitary plastic parallel ribs, the first set of ribs fixedly attached and transverse to the second set of ribs and the first and second sets of ribs being disposed on opposite sides of a median plane of the sheet, both first and second sets of ribs oriented obliquely with respect to sides of the sheet;
 c) coiling said net-like sheet into a substantially cylindrical shape; and
 d) inserting the coiled net-like sheet of step c) into the retaining vessel.

4. The method according to claim 3 comprising inserting a plurality of contactors within the retaining vessel.

5. An apparatus for use in mass transfer comprising a coiled core substantially cylindrical in shape and having a plurality of plastic straps to maintain the cylindrical shape, said coiled core formed from a flexible plastic net-like material having a first set of substantially parallel solid unitary ribs and a second set of substantially parallel solid unitary ribs transverse and intersecting in a diamond pattern with the first set of ribs, the first and second sets of ribs forming spiral fluid flow paths with the first and second sets of ribs forming alternating layers of flow paths spiraling in opposite directions.

* * * * *